United States Patent [19]
Lim

[11] Patent Number: 5,854,721
[45] Date of Patent: Dec. 29, 1998

[54] BALANCING DEVICE OF ACTUATOR IN HARD DISK DRIVE

[75] Inventor: Beoyng-Cheol Lim, Seoul, Rep. of Korea

[73] Assignee: SamSung Electronics Co., Ltd., Suwon, Rep. of Korea

[21] Appl. No.: 541,552

[22] Filed: Oct. 10, 1995

[30] Foreign Application Priority Data

Oct. 17, 1994 [KR] Rep. of Korea .................. 1994 26494

[51] Int. Cl.$^6$ .................................................. G11B 5/48
[52] U.S. Cl. ........................................... 360/106; 360/104
[58] Field of Search .................... 360/104–106, 360/97.01

[56] References Cited

U.S. PATENT DOCUMENTS

| | | | |
|---|---|---|---|
| 4,724,500 | 2/1988 | Dalziel | 360/104 |
| 4,772,974 | 9/1988 | Moon et al. | 360/98 |
| 4,797,763 | 1/1989 | Levy et al. | 360/104 |
| 4,912,583 | 3/1990 | Hinlein | 360/104 |
| 4,942,491 | 7/1990 | Osawa et al. | 360/104 |
| 4,995,025 | 2/1991 | Schulze | 360/106 |
| 5,027,241 | 6/1991 | Hatch et al. | 360/105 |
| 5,062,018 | 10/1991 | Yaeger | 360/104 |
| 5,146,450 | 9/1992 | Brooks et al. | 360/105 |
| 5,153,794 | 10/1992 | Hinlein | 360/104 |
| 5,185,683 | 2/1993 | Oberg et al. | 360/104 |
| 5,187,626 | 2/1993 | Hopkins et al. | 360/104 |
| 5,191,705 | 3/1993 | Toensing | 360/104 |
| 5,225,949 | 7/1993 | King et al. | 360/104 |
| 5,262,911 | 11/1993 | Cain et al. | 360/104 |
| 5,305,169 | 4/1994 | Anderson et al. | 360/105 |
| 5,363,260 | 11/1994 | Kawakami | 360/97.01 |
| 5,369,538 | 11/1994 | Moe et al. | 360/106 |
| 5,390,058 | 2/1995 | Yamaguchi | 360/104 |
| 5,404,636 | 4/1995 | Stefansky et al. | 29/603 |
| 5,444,587 | 8/1995 | Johnson et al. | 360/104 |
| 5,497,282 | 3/1996 | Hoffmann et al. | 360/104 |

*Primary Examiner*—Stuart S. Levy
*Assistant Examiner*—Brian E. Miller
*Attorney, Agent, or Firm*—Robert E. Bushnell, Esq.

[57] ABSTRACT

A balancing device of an actuator in a hard disk drive, for mass balancing an actuator arm which rotates about a pivot bearing. The balancing device includes an actuator arm having a mounting hole at a distal end therein, and being adapted to carry a head gimbal assembly and a balance gimbal; and the balance gimbal having a circular throat protruding from one end thereon and being assembled to actuator arm by mounting the circular throat into the mounting hole of actuator arm and snapping a ball bearing into the circular throat to thereby secure the circular throat against opposite surface of the mounting hole, so as to mass balance the actuator arm when the actuator rotates about its axis of rotation.

6 Claims, 4 Drawing Sheets

BALANCING DEVICE OF ACTUATOR IN HARD DISK DRIVE

CROSS-REFERENCE TO RELATED APPLICATIONS

This application makes reference to, incorporates the same herein, and claims all benefits accruing under 35 U.S.C. §119 from an application for Balancing Device Of Actuator In Hard Disk Drive earlier filed in the Korean Industrial Property Office on 17 Oct. 1994 and there assigned Ser. No. 26494/1994.

BACKGROUND OF THE INVENTION

Technical Field

The present invention relates to a hard disk apparatus, and in particular, to a balance device of an actuator in a hard disk apparatus for balancing an actuator arm which rotates about a pivot bearing.

Background Art

In general, a hard disk apparatus of a rotary actuator type, for example, as shown in U.S. Pat. No. 5,146,450 for Method And Apparatus For Bearing To Comb Attachment issued to Brooks et al., U.S. Pat. No. 5,305,169 for Rotary Actuator Disk Drive issued to Anderson et al., U.S. Pat. No. 5,363,262 for Magnetic Disk Apparatus And Method For Manufacturing The Same issued to Kawakami, U.S. Pat. No. 5,369,538 for Rotary Disk Drive Actuator issued to Moe et al., and U.S. Pat. No. 5,404,636 for Method Of Assembling A Disk Drive Actuator issued to Stefansky et al., is constructed with a generally, rectangularly shaped base serving as a frame accommodating a single circular disk or a plurality of circular disks coaxially mounted in a stack upon a spindle driven by a motor mounted on a base to provide a plurality of cylindrical base surfaces that serve as a memory into which binary information may be written and read. An actuator is mounted upon the base by a pivot bearing such as a threaded fastener to freely rotate about the longitudinal axis of pivot, and a voice coil motor assembly is positioned on the base to respond to electrical control signals and thereby arcuately displace a proximal end of the actuator. An actuator arm supports, at its distal end, a single head gimbal assembly or a plurality of head gimbal assemblies with electromagnetic transducers commonly known as read/write heads corresponding to the distinct separate cylindrical base surfaces of the disks that serves as memories.

Head gimbal assemblies are flexible and available in different designs such as those noted in, for example, U.S. Pat. No. 4,724,500 for Mechanism For Preventing Shock Damage To Head Slider Assemblies And Disks In Rigid Disk Drive issued to Dalziel, and U.S. Pat. No. 4,797,763 for Compact Magnetic Head Flexible Suspension issued to Levy et al.; and are mounted onto the actuator arm by way of, for example, a bolt and mold finger protruding from a nut plate as is mentioned in U.S. Pat. No. 4,912,583 for Clamp For Mounting Head-Load Beam Slider Arm In A Disk Drive issued to Hinlein, a ball bearing and mold finger protruding from a base plate as is noted in U.S. Pat. No. 5,185,683 for Suspension Arm Mounting Assembly issued to Oberg, or a boss with corresponding mounting holes as is represented by in U.S. Pat. No. 5,262,911 for Apparatus And Method For Mounting Transducer Heads In A Hard Disk Drive issued to Cain et al. The base surfaces of the disk are typically coated with a magnetically sensitive material that responds to fields created by corresponding actuator heads, to enable the actuator heads to either write bits of information at selected locations along tracks formed on the surface of the disk, or to read information from those tracks. Generally, a disk continuously rotates in a single direction while the voice coil motor assembly acts upon the proximal end of the actuator arm to arcuately displace the proximal arm relative to motor and thereby cause the distal ends of actuator arm to radially position the heads along the corresponding base surface of the disk. A cover is then mounted upon the upper surface of the base, to enclose disks, actuator and voice coil motor assembly, and to thereby seal the interior of disk drive in order to protect the environment where the disks reside from dust and contaminants.

If the hard disk apparatus is constructed to accommodate a plurality of circular disks, the actuator arm must accommodate a corresponding number of head gimbal assemblies. In both constructions however, the actuator is often mass imbalanced with its left and right portions rotating about pivot bearing, and the imbalance of the actuator imposes an adverse influence on the seek time, vibration characteristic, and servo characteristic of the disk drive. In an effort to improve mass imbalance of the rotary actuator, some rotary actuators such as those noted, for example, in U.S. Pat. No. 4,772,974 for Compact Head And Disk Assembly issued to Moon et al., and U.S. Pat. No. 5,305,169 for Rotary Actuator Disk Drive issued to Anderson et al., carry a counterweight for mass balancing any imbalances presented by an actuator arm supporting a head gimbal assembly at one end of a pivot bearing. In Anderson '169, a balance weight of non-magnetic material is inserted by insertion molding into a plastic coil support arm supporting a voice coil motor assembly so as to achieve mass balance with the actuator arm structure. In these mass balancing techniques however, I have observed that not only is it difficult to achieve mass balance with an actuator arm structure rotating about its pivot bearing axis when the actuator arm supports, at its distal end, a plurality of head gimbal assemblies instead of a single head gimbal assembly, but that these techniques are also costly.

SUMMARY OF THE INVENTION

Accordingly, it is therefore an object of the present invention to provide an improved and inexpensive balancing device for an actuator in a hard disk drive.

It is also an object of the present invention to provide a method for mass balancing an actuator arm with a balancing device capable of being assembled with a head gimbal assembly in a relatively simple manner.

In order to achieve these and other objects, the present invention contemplates upon a balance gimbal assembled and mounted onto a distal end of an actuator arm to mass balance any imbalances presented when actuator rotates about its pivot bearing and to thereby minimize response to acceleration forces having components acting perpendicularly to the actuator axis. Specifically, the present invention contemplates upon an actuator arm having a mounting hole at a distal end of the arm, with the actuator arm carrying a head gimbal assembly and a balance gimbal. The balance gimbal which has a circular, cylindrical throat protruding from one end, is assembled with the actuator arm by mounting the circular, cylindrical throat into the mounting hole of the actuator arm and inserting a rotary bearing into the circular, cylindrical throat to secure the circular, cylindrical throat against the opposite surface of the mounting hole, so as to mass balance the actuator arm when the actuator rotates about its axis of rotation.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
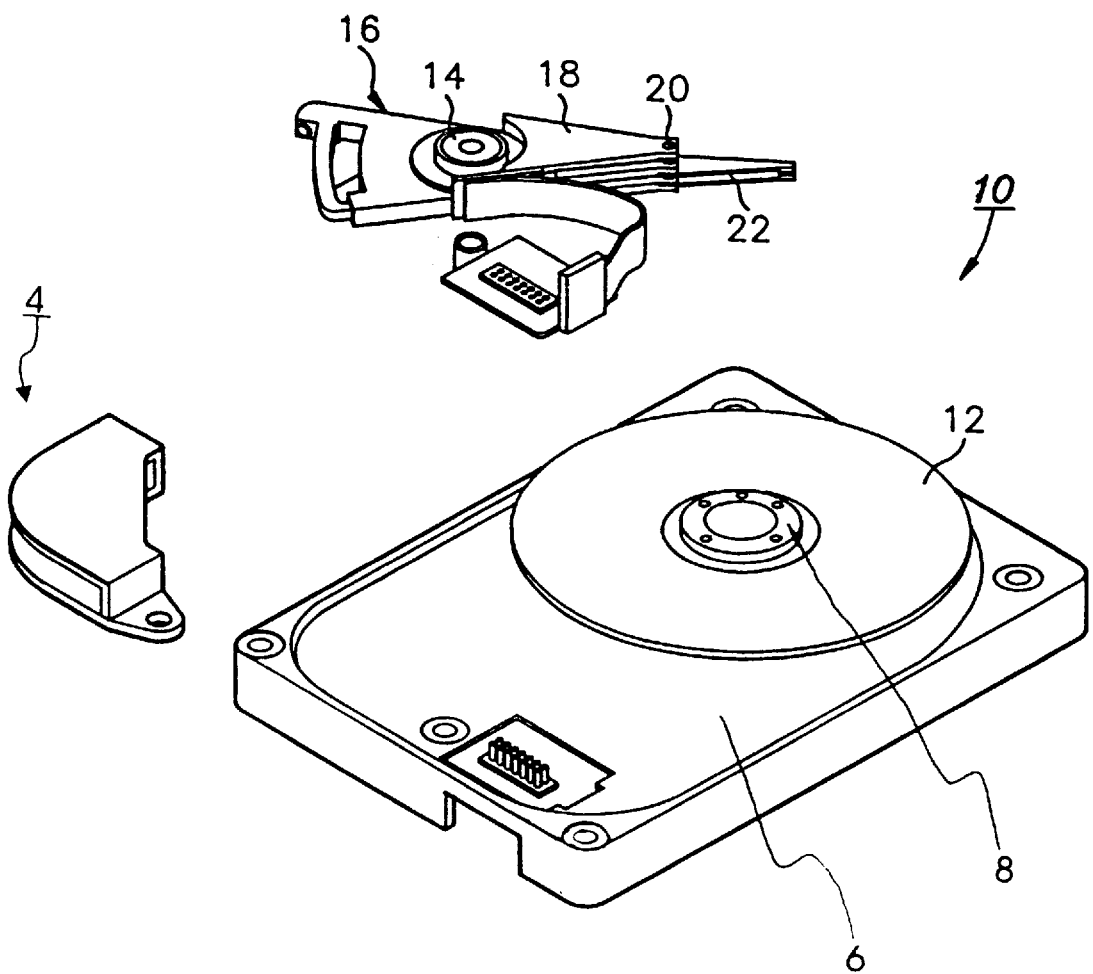
FIG. 1 is a perspective view illustrating an inner construction of a conventional head disk drive.

Referring now to the drawings and particularly to FIG. 1 which illustrates a hard disk drive 10 of a rotary actuator type showing its cover removed. The disk drive 10 has a housing having a substantially rectangular shaped base 6 serving as a frame providing a major interior surface accommodating at least one circular disk 12 coaxially mounted upon a spindle shaft 8 of motor fixed on base 6, an actuator 16 mounted upon pivot bearing 14 so as to freely rotate about the longitudinal axis of pivot bearing 14, a voice coil motor assembly 4 mounted onto base 6 so as to serve as drive mechanism for rotating the actuator 16 when a control current flows through coil by an interaction of magnetic fluxes produced individually by the coil and magnet placed therein. An actuator 16 including an actuator arm 18 supports, at its distal end, an electromagnetic transducer head. As the disk 15 rotates during operation, the transducer head reads or writes information on or from the disk 12 in a manner such that the transducer head is kept narrowly above the disk surface.

As shown in FIG. 1, the hard disk drive 10 only has a single circular disk 12; accordingly, only one head gimbal assembly 22 is necessary to accommodate a singular disk 12. In order to accommodate a plurality of circular disks 12, however, the actuator arm assembly 18 may be constructed in a comb-like structure having a plurality of arms accommodating, at its distal end, a corresponding plurality of head gimbal assemblies 22. That is, the number of head gimbal assemblies 22 may be adjusted in accordance with the number of the circular disks 12 and the head gimbal assemblies 22 are installed at the actuator arm 18. When the hard disk 10 is constructed to accommodate either a single circular disk or a plurality of circular disks, however, the actuator arm is often mass imbalanced with its left and right portions rotating about the pivot bearing, and the imbalance of the actuator arm imposes adverse influence on seek time, vibration characteristic, and servo characteristic of the disk drive. In order to improve mass imbalance of the rotary actuator, conventional art typically relies upon a balance plate 40 as compositely shown in FIG. 2 and individually shown in FIG. 3 as a balancing device for compensating the mass imbalance of the actuator arm 18 as the actuator 16 rotates about the pivot bearing 14.

Figure 2:
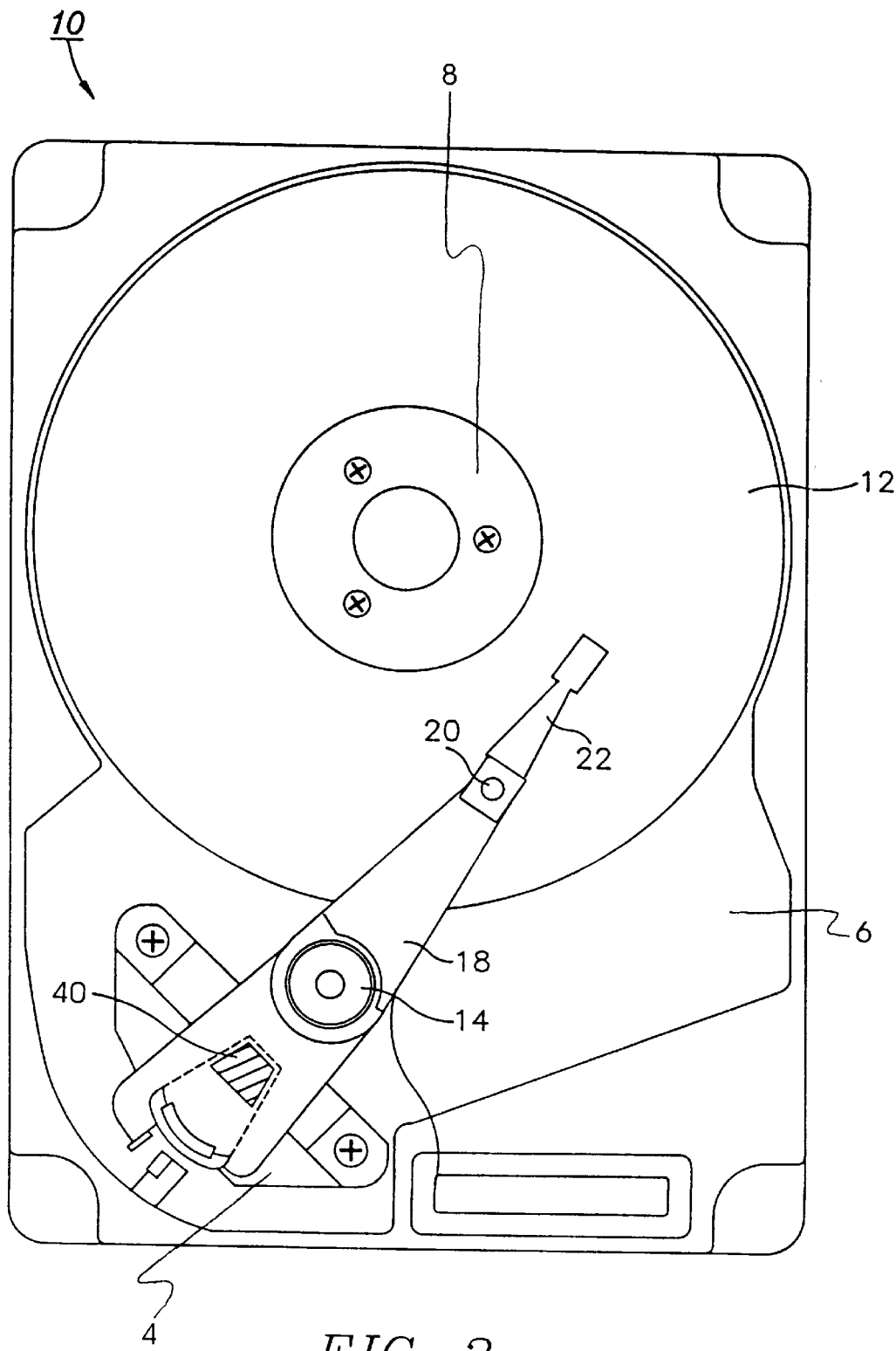
FIG. 2 is a plane view illustrating an actuator of a conventional hard disk drive having a balancing device.
Figure 3:
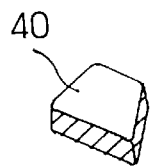
FIG. 3 is a perspective view illustrating the conventional balancing device.

Balance plate 40 as shown in FIG. 2 and FIG. 3 is slightly different from that disclosed in Anderson '169, and is typically mounted upon one side of the actuator 16 by adhesive. For every additional head gimbal assembly that is needed to accommodate a corresponding disk 12 however, the balance plate 40 has to be adjusted and extra weight must be added. As a result, I have observed the following problems: First, it is difficult to assemble the proper balance plate in order to mass balance the actuator. Second, the assembling characteristic of the balance plate may be degraded because adhesive is used to mount the balance plate onto the actuator. Third, it is expensive to assemble such a balance plate because it has to be casted. Fourth, if the number of head gimbal assemblies increases, the actuator arm becomes heavier, and that results in a deterioration of the performance of the hard disk drive.

Figure 4:
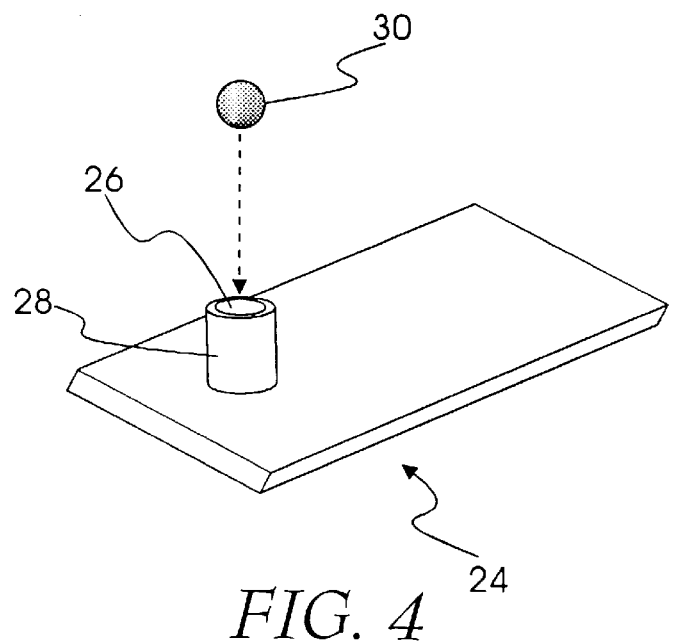
FIG. 4 is a perspective view illustrating an actuator arm having a balancing device constructed according to the principles of the present invention.

Turning now to FIG. 4, a novel balancing device is illustrated as contemplated by the present invention for mass balancing an actuator arm 18 in a hard disk drive 10 as the actuator 16 rotates about its axis of rotation 15 coaxially positioned through the center of rotation of pivot bearing 14. As shown in FIG. 4, the balancing device as constructed according to the principles of the present invention is referred to as a balance gimbal 24 of non-magnetic material, designed to counter-balance any mass imbalances presented by the actuator arm 18 as the actuator 16 rotates about the pivot bearing 14. This balance gimbal is constructed with a balance plate having a predetermined mass, and a circular, cylindrical throat 28 disposed at one end of balance plate and protruded from an overside of the balance plate. The circular, cylindrical throat 28 includes an opening 26 for receiving low friction rotary bearing such as a ball bearing 30 when the balance device is mounted onto a distal end of the actuator arm 18. The circular, cylindrical throat 28 of the balance plate may be formed by a machining process.

Figure 5:
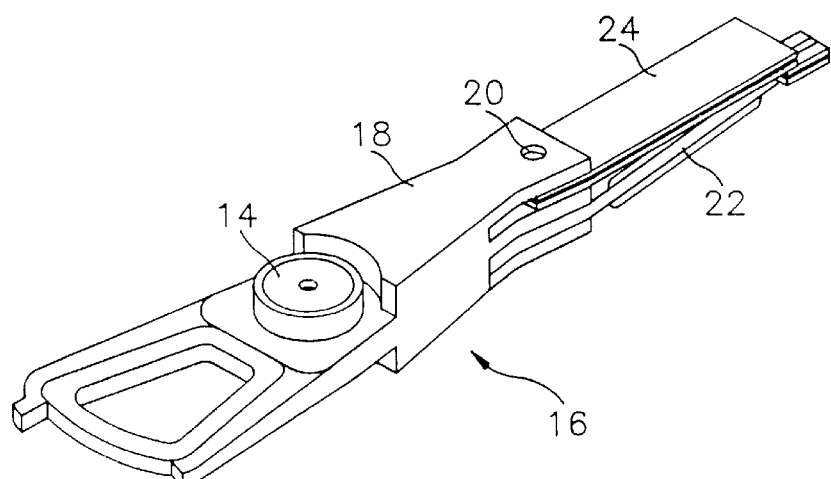
FIG. 5 is a perspective view illustrating a balancing device constructed according to the principle of the present invention.

FIG. 5 illustrates the actuator 16 including the novel balance gimbal 24 as constructed according to the principles of the present invention. The actuator arm 18 should have a comb-shaped structure with a mounting hole 20 at a distal end of each arm to accommodate the balance gimbal 24 as well as individual head gimbal assembly 22. As shown in FIG. 5, the balance gimbal 24 as well as the head gimbal 22 are mounted onto the actuator arm 18 by way of the mounting hole 20. Specifically, the circular, cylindrical throat 28 of the balance gimbal 24 is placed into the mounting hole 20 of the first arm, and is then secured with the actuator arm 18 by forcing a ball bearing 30 into the opening 26 of the circular, cylindrical throat 28 and thereby expand the circular, cylindrical throat 28 to secure against the opposite surface of the mounting hole 20 of the actuator arm 18. A rotary bearing characterized by low frictional forces such as ball bearing 30 is inexpensive and provides good holding power, ease of installation, and a low profile assembly and can be removed by simply pressing the ball bearing 30 out of the circular, cylindrical throat 28. The use of a ball bearing for the gimbal also allows a lower gimbal point and provides greater stability and better flying characteristics. Individual head gimbal assembly 22 including a transducer head is then mounted onto the mounting hole 20 of each succeeding arm of the actuator arm assembly 18. Accordingly, the balance gimbal 24 as constructed in accordance with the principles of the present invention can mass balance left and right portions of actuator arm 18 of the hard disk drive 10 as the actuator 16 rotates about its axis of rotation.

Figure 6A:
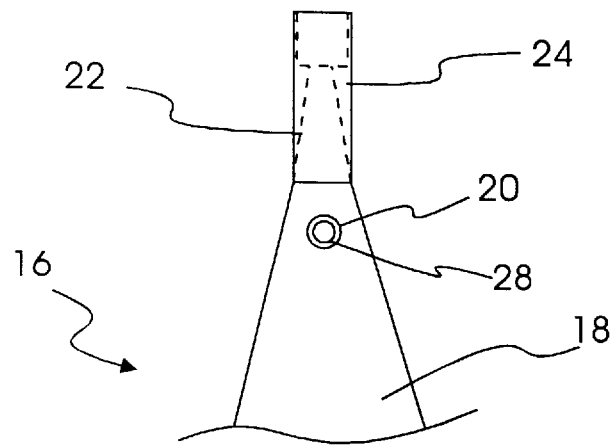
FIG. 6A and 6B are a respectively plane view and a right sectional view illustrating a portion of a balancing device shown in FIG. 4, respectively, in which the balancing device is mounted to a mounting hole of an actuator arm according to the present invention.
Figure 6B:
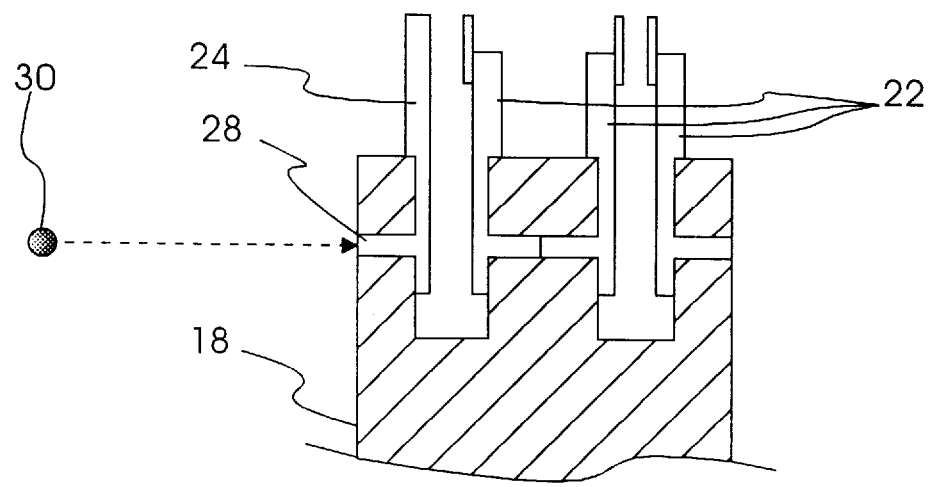

FIG. 6A illustrates a plane view of the balance gimbal 24 having the circular, cylindrical throat 28 and the head gimbal assembly 22 mounted onto the mounting hole 20 of the actuator arm 18 according to the principles of the present invention. FIG. 6B illustrates a right sectional view of one embodiment of how a balance gimbal 24 as assembled by way of forcing the ball bearing 30 into the circular, cylindrical throat 28 via the mounting hole 20 of the actuator arm 18 can mass balance the actuator arm 18 accommodating, for example, three successive head gimbal assemblies 22 as the actuator 16 rotates about the pivot bearing 14. To prevent the mass imbalance of the actuator 16 accommodating three head gimbal assemblies 22, the balance gimbal 24 is constructed to have the same weight of that of a single head gimbal assembly 22. Accordingly, the mass of the balance gimbal 24 does not change or vary in dependence upon the number of head gimbal assembly 22 employed. The number of balance gimbals 24 however, may be adjusted in accordance with the number of disks and corresponding head gimbal assemblies employed in the hard disk drive.

Accordingly, it is possible to provide servo stability by assembling one balance gimbal 24 and then maintaining the actuator arm 18 at a constant weight. Also, it is possible to assemble the balance gimbal 24 of the present invention and the head gimbal assembly 22 to the actuator arm 18 simultaneously in the same manner as described above. This improves the actuator assembly process and increases assembly productivity. Moreover, since the actuator 16 is maintained at a constant weight, the seek time, vibrating characteristic and servo characteristic of the actuator 16 are improved.

While there have been illustrated and described what are considered to be preferred embodiments of the present invention, it will be understood by those skilled in the art that various as changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A balancing device for a disk drive, comprising:
    a balance gimbal;
    an actuator arm having a comb-shaped structure with a mounting hole at a distal end and a plurality of head gimbal assemblies each supporting a transducer head for recording on and reading data information from a recording medium; and
    said balance gimbal different from said head gimbal assemblies and having a circular throat protruding from one end mounted into said mounting hole of said actuator arm by a ball swaging process, said balance gimbal having the same mass as each head gimbal assembly and being configured not to support said transducer head but to mass balance said actuator arm as said actuator arm rotates about an axis of rotation, when said plurality of head gimbal assemblies mounted on said actuator arm is less than a predetermined number of head gimbal assemblies configured by said actuator arm.

2. The balancing device of claim 1, further comprised of said balance gimbal having a predetermined mass of non-magnetic material for balancing any mass imbalance presented by said actuator arm as said actuator arm rotates about its axis of rotation.

3. A disk drive, comprising:
    a base having a substantially rectangular shape;
    at least one recording medium;
    rotating means mounted on the base, for rotating the recording medium;
    an actuator assembly rotatably mounted on the base by a pivot bearing, said actuator assembly including an actuator arm having a comb-shaped structure with a mounting hole at a distal end and a plurality of head gimbal assemblies each supporting a transducer head for recording and reading information on the recording medium;
    at least a balance gimbal different from said head gimbal assemblies mounted on said actuator arm, said balance gimbal having the same mass as each head gimbal assembly and being configured not to support said transducer head but to mass balance said actuator arm as said actuator arms rotates about an axis of rotation, when said plurality of head gimbal assemblies mounted on said actuator arm is less than a predetermined number of head gimbal assemblies configured by said actuator arm; and
    a voice coil motor assembly for enabling said actuator arm to rotate substantially in a radial direction of the recording medium about said pivot bearing, wherein said balance gimbal comprises a balance plate and a circular throat protruding from one end of said balance plate, and is mounted on said actuator arm by placing said circular throat into said mounting hole of said actuator arm and snapping a ball bearing through said circular throat to thereby secure said circular throat against an interior surface of said mounting hole, for balancing any mass imbalance presented by said actuator arm as said actuator a rotates in said radial direction of the recording medium.

4. The disk drive of claim 3, further comprised of said balance gimbal having a predetermined mass of non-magnetic material for balancing any mass imbalance presented by said actuator arm as said actuator arm rotates in said radial direction of the recording medium.

5. A method for mass balancing any mass imbalance presented by an actuator arm in a disk, comprising the steps of:
    assembling a plurality of head gimbal assemblies on said actuator arm having a comb-shaped structure configured to carry a predetermined number of head gimbal assemblies via a mounting hole with each head gimbal assembly supporting a transducer head;
    preparing a balance gimbal different from said head gimbal assemblies but having the same mass as each head assembly, and configured not to support said transducer head but to mass balance said actuator arm when said plurality of head gimbal assemblies mounted on said actuator arm is less than said predetermined number of head gimbal assemblies configured by said actuator arm, said balance gimbal having a balance plate and a circular throat protruding from one end of said balance plate with an opening in a distal end of said circular throat;

placing said circular throat of said balance gimbal into said mounting hole of said actuator arm; and providing mass balance to said actuator arm when said actuator arm rotates in a radial direction of the recording medium about an axis of rotation, after a ball bearing is inserted into said circular throat to secure said circular throat against an interior surface of said mounting hole of said actuator arm.

6. The method of claim 5, further comprised of said balance gimbal having a predetermined mass of non-magnetic material for balancing any mass imbalance presented by said actuator arm when said actuator arm rotates in said radial direction of the recording medium.

\* \* \* \* \*